United States Patent [19]

McClain et al.

[11] Patent Number: 5,166,692
[45] Date of Patent: Nov. 24, 1992

[54] METHOD AND APPARATUS FOR ADAPTIVE RADAR ENVIRONMENTAL SIGNAL FILTRATION

[75] Inventors: Donald C. McClain, Fountain Valley; Andrew L. Spradley, Orange; Ki H. Baek, El Toro, all of Calif.

[73] Assignee: Loral Aerospace Corp., New York, N.Y.

[21] Appl. No.: 746,956

[22] Filed: Aug. 19, 1991

[51] Int. Cl.$^5$ .................. G01S 7/285; G01S 7/292; G01S 7/34
[52] U.S. Cl. .................. 342/192; 342/195; 342/91; 342/97; 342/62
[58] Field of Search .......... 342/192, 193, 194, 195, 342/196, 197, 89, 90, 91, 92, 93, 94, 95, 97, 62

[56] References Cited

U.S. PATENT DOCUMENTS

| | | | |
|---|---|---|---|
| 3,946,382 | 3/1976 | Kossiakoff et al. | 342/93 |
| 4,005,451 | 1/1977 | Kossiakoff et al. | 342/90 |
| 4,012,627 | 3/1977 | Antoniak | 342/93 X |
| 4,249,177 | 2/1981 | Chen | 342/93 |
| 4,274,095 | 6/1981 | Phipps et al. | 342/93 |
| 4,360,811 | 11/1982 | Cantwell, Jr. et al. | 342/93 |
| 4,578,676 | 3/1986 | Harrison, Jr. | 342/89 |
| 4,586,043 | 4/1986 | Wolf | 342/93 |
| 4,786,909 | 11/1988 | Payne | 342/94 |

Primary Examiner—John B. Sotomayor
Attorney, Agent, or Firm—John S. Ferrell; Kenneth M. Kaslow; Edward J. Radlo

[57] ABSTRACT

An adaptive RADAR environmental signal filter (1) is described which selectively preprocesses RF RADAR input data prior to the data's utilization by a processor (8). The filter (1) consists of an array of parallel discriminator cells (165) which compare incoming RF RADAR data to a window parameterized by predetermined threshold values. The array of discriminator outputs are networked through combinational logic (59) in order to provide an output correlation signal (63) to an external processor (8). A discriminator enable latch (55) synchronizes the discriminator outputs as the outputs pass through the combinational logic (59).

3 Claims, 4 Drawing Sheets

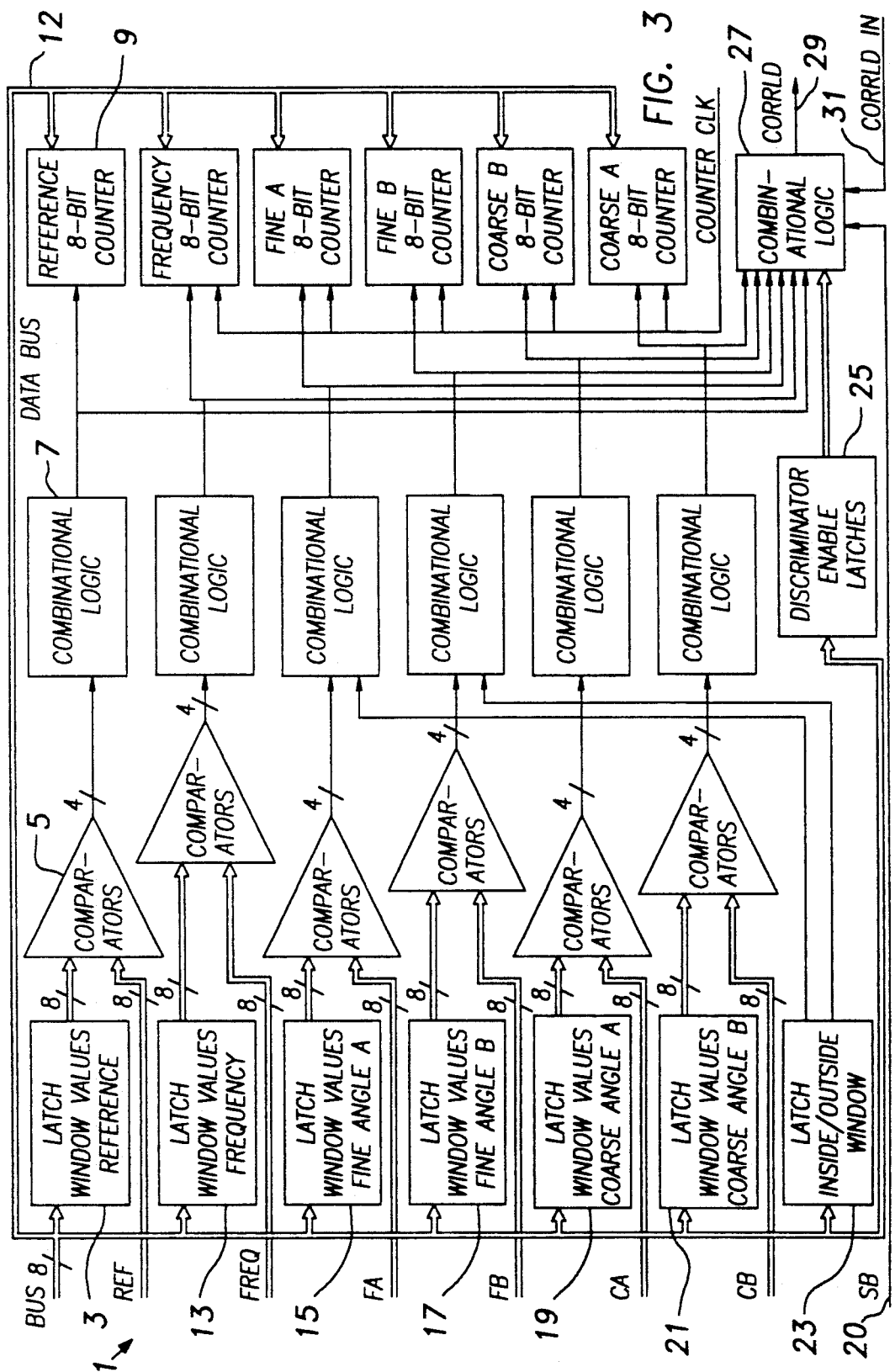

METHOD AND APPARATUS FOR ADAPTIVE RADAR ENVIRONMENTAL SIGNAL FILTRATION

BACKGROUND OF THE INVENTION

This invention relates to electronic signal conditioning and more particularly to the filtering of RADAR signal data using an adaptive conditioning network to selectively transmit signal information for more efficient processing.

RADAR systems mounted aboard missiles and other target seeking projectiles are highly constrained by weight, power, size and to some degree, cost limitations. Design of these missile RADAR seekers is further complicated by the fact that since the units are traveling at speeds in excess of Mach 1, real time operation of the missile system results in the collection of vast quantities of rapidly changing data. Data which is not quickly processed soon becomes obsolete. Exacerbating the difficulty of handling enormous amounts of available data are the limits on computational power imposed by the weight, power and size constraints of the missile payload.

SUMMARY OF THE INVENTION

In accordance with the present invention, an environmental signal filter (1) gate array is described for use in the preprocessing of RADAR signals within missile seeker systems (10). The preprocessing filter (1) is used to thin incoming RADAR pulse information from the RF receiver before it is sent to the computer processor (8). Digitized RADAR pulse data is applied to a network of adaptive comparators (5) to filter out extraneous and unnecessary information. This preprocessing allows the missile seeker (10) to operate in a very dense RADAR signal environment without taxing the processing power of the on-board processor (8). Preprocessing is achieved by comparing the characteristics (discriminants) of the incoming pulses against upper and lower limits and ignoring those pulses which fall outside of the limits. The upper and lower limits define the window of acceptability for each discriminant. The window for each discriminant can be programmed individually using a discriminant mask field. Individual counters (47) keep track of each discriminant as incoming pulses are passed. Using the counter (47) information, the on-board processor (8) provides threshold control over window width based on preprogrammed parameters as applied to the incoming data stream.

BRIEF DESCRIPTION OF THE DRAWINGS

FIG. 3 is a functional block diagram of the environmental signal filter 1 of FIG. 2;

DESCRIPTION OF THE PREFERRED EMBODIMENT

Figure 1:
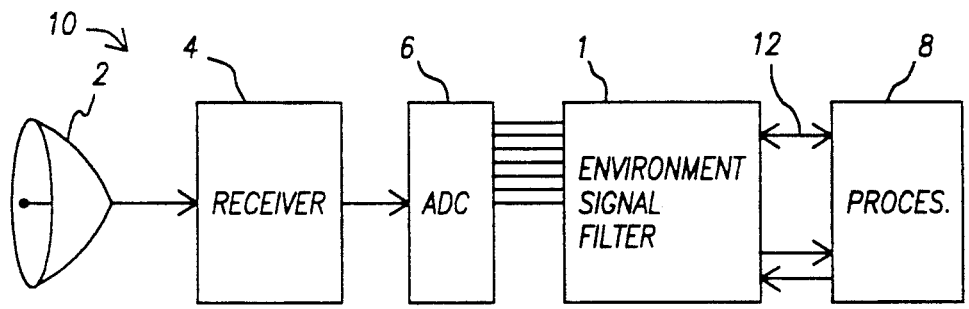
FIG. 1 is a block diagram showing a typical missile seeker system (10) in which the environmental signal filter 1 of the present invention is utilized.

FIG. 1 shows a typical missile seeker system 10 in which the environmental signal filter 1 of the present invention is utilized. In application, the missile seeker 10 receives reflected pulsed radio frequency (RF) signals from RADAR 2. The signals are amplified and separated in receiver 4 and digitized in analog to digital converter (ADC) 6 prior to undergoing preprocessing in environmental signal filter 1. Signal filter 1 removes part of the incoming signal by eliminating data which lies outside acceptable parameters set by processor 8. Processor 8 then receives the filtered data which it uses to provide control instructions to the missile upon which the seeker system 10 is mounted.

Figure 2:
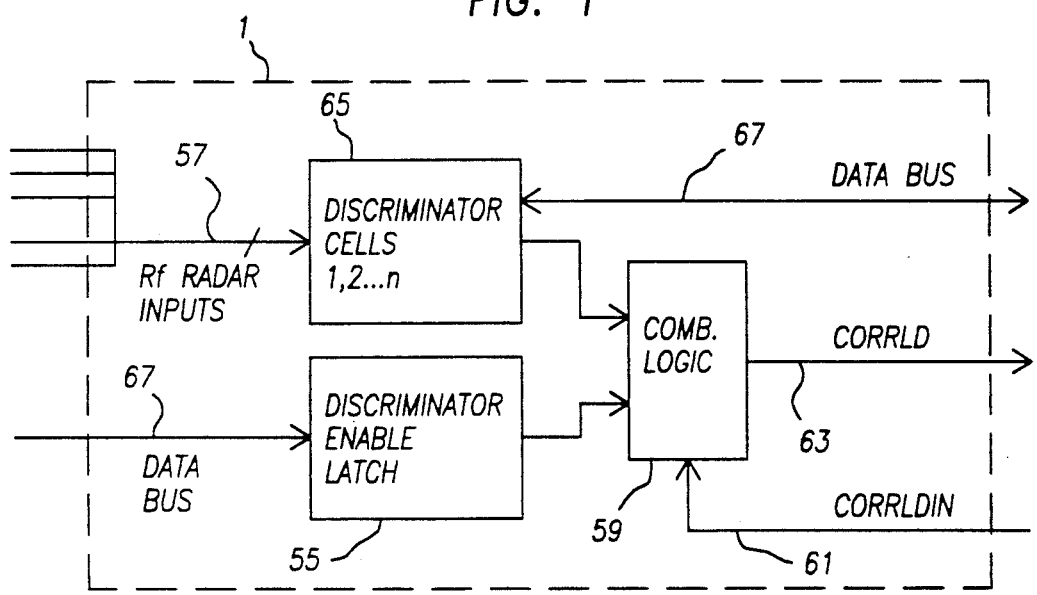
FIG. 2 is a schematic block diagram of the environmental signal filter 1 comprising a plurality of parallel discriminator cells 65.

Referring now to FIG. 2, a schematic block diagram of the environmental signal filter 1 is shown. The preferred embodiment consists of a plurality of RF RADAR inputs 57 connected to an array of parallel discriminator cells 65. These discriminator cells 65 provide output signals to a combinational logic block 59 which networks the inputs to produce a correlation load output 63. Each of the discriminator cells 65 are synchronized with processor 8 (FIG. 1) by way of discriminator enable latch 55, which receives input from processor 8 through data bus 67. The correlation load signal 63 is synchronized with processor 8 through correlation load input 61.

The internal operation of the signal filter 1 can be more easily understood by referring to FIG. 3. In the preferred embodiment, the signal filter 1 consists of six discriminator cells 65 described above. Each discriminator cell 65 has a latch 3 which receives upper and lower threshold data from data bus 12, and which stores this threshold data to comparator 5. An incoming pulsed RADAR signal is simultaneously applied to each of the comparators 5 and logically evaluated relative to the data stored in latch 3. Through a network of combinational logic 7, a logical TRUE output signal is further applied to combinational logic 27 to provide the correlation load signal 29. The purpose of each of these discriminator cells 65 is to establish whether an incoming signal characteristic, specific to an individual discriminator cell 65, lies within a range or a window of acceptable values, Each window comparator 5 has an upper and lower threshold through which intramarginal data values may pass.

The purpose of discriminator cells 65 is to mask out unwanted data. Discriminator cells 65 are individually programmed by processor 8 by writing or storing a parallel set of threshold values to the field of discriminator cells 65 in a format referred to as the mask field. Various RADAR signal parameters generated by receiver 4 are discriminated by signal filter 1. Latch 3, referred to as the reference latch, compares amplitude or power in the RADAR signal. Latch 13 is used to check the frequency range of the incoming signal with respect to pulse repetition rate. Latch 15 and latch 17 are fine angle adjustments which relate to RADAR phase information. Course angle A latch 19 and course angle B latch 21 test for additional RADAR data characteristics based on amplitude. Sideband signal 20 is useful for daisy chaining multiple signal filters 1.

Figure 4:
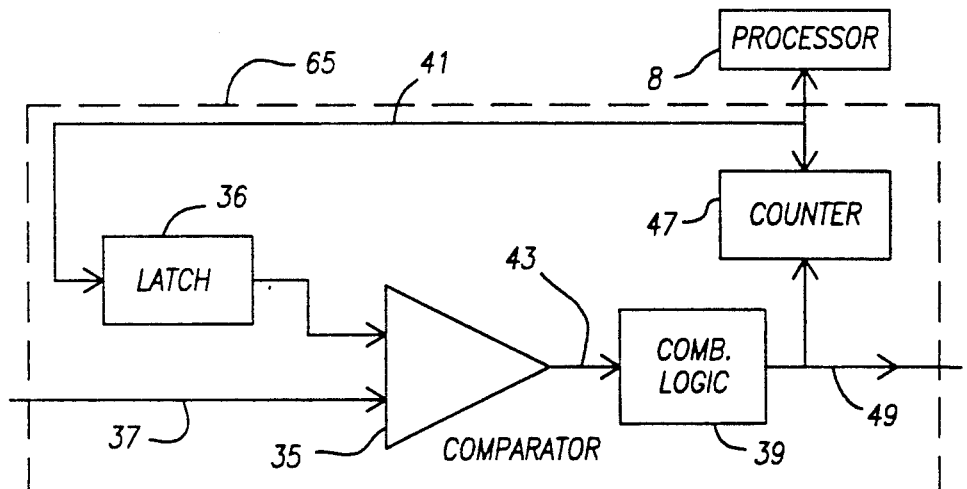
FIG. 4 is a schematic block diagram of a single discriminator cell 65 of the present invention.

Referring now to FIG. 4, the individual discriminator cell 65 is shown in more detail. Comparator 35 logically compares pulsed RF RADAR inputs 37 to stored threshold data maintained in latch 36. In the preferred embodiment, both RF input 37 data and stored latch 36 information contains eight data bits. The single bit logical True/False comparator data output 43 which results from the logical comparison of the input data is transmitted to combinational logic 39 to produce discriminator output 49. This discriminator output 49 provides pulses to counter 47 which are then detected by processor 8. The processor 8 periodically polls the data stored in counter 47 to determine the rate at which RF input data 37 is actually being transmitted to processor 8. Processor 8 uses the rate data to control signal flow by continuously varying the threshold values stored in latch 36. If the data throughput to processor 8 becomes such that the throughput inordinately taxes the computational capabilities of processor 8, narrower threshold values are transmitted to latch 36 to effectively thin out the amount of RF input data 37 sent to processor 8. If the data flow becomes too sparse, processor 8 sends latch 36 a set of wider threshold parameters to allow the acceptance of more data. This adaptive filtering of data based on comparison to a dynamic set of threshold values is repeated in each of the six discriminator cells 65 of FIG. 2.

Figures 1, 5:
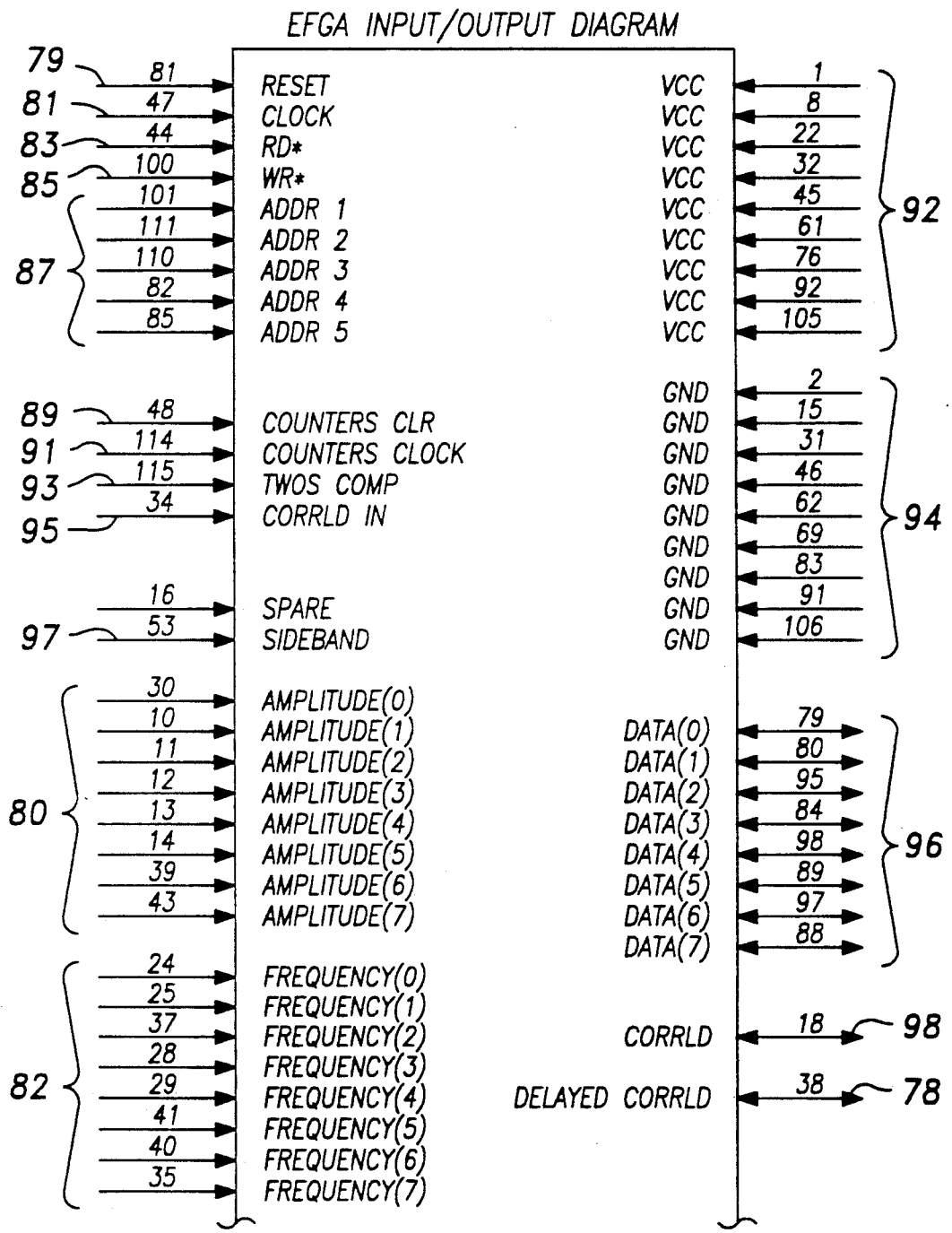
FIG. 5 is a block diagram showing the gate array pin locations used in the preferred embodiment of the environmental signal filter 1.
Figures 2, 5:
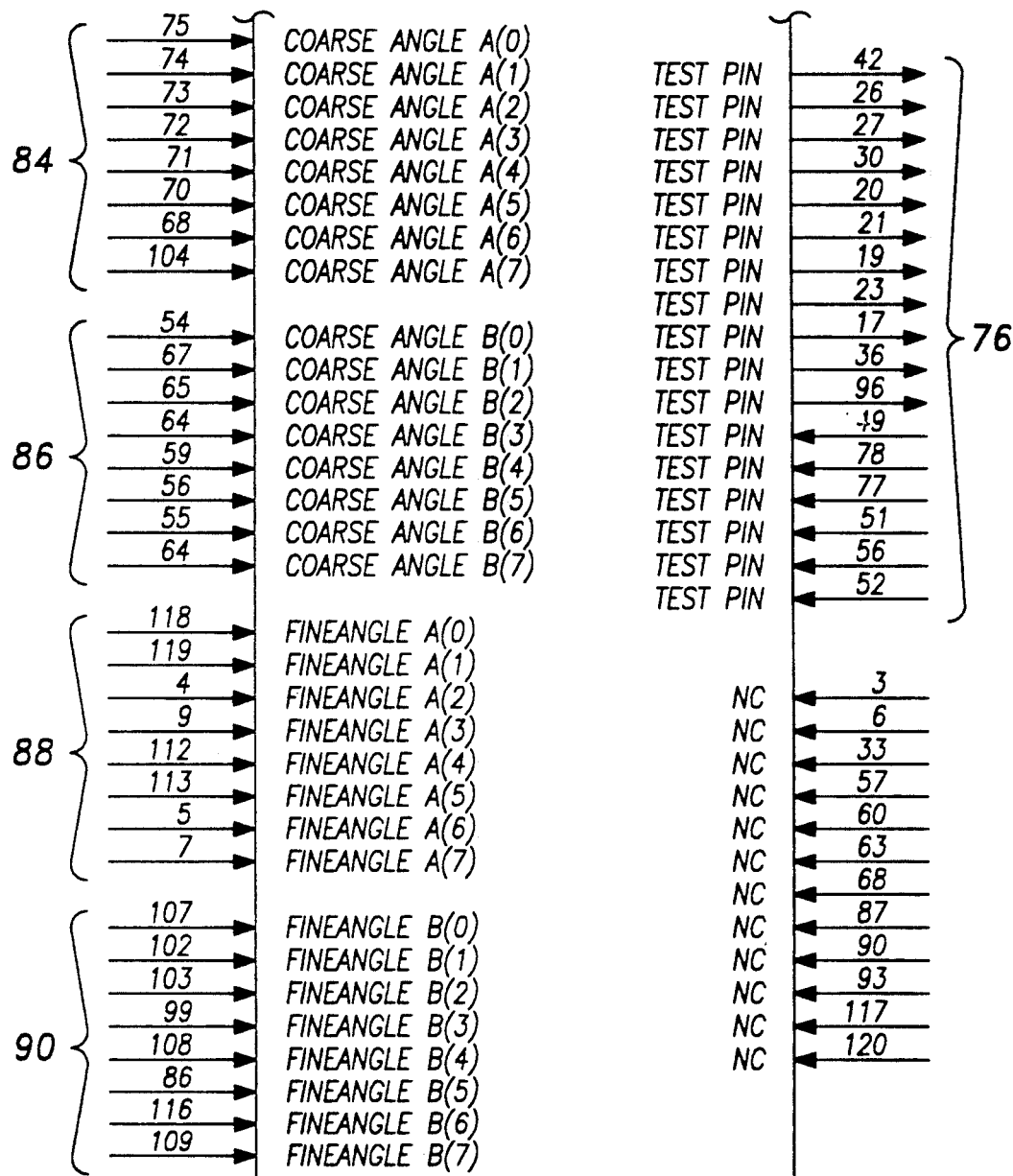

Referring now to FIG. 5, a block diagram is shown of the pin locations in the preferred single chip embodiment of the environmental signal filter 1. The control lines on the package include Reset 79, Clock 81, Read 83, and Write 85. The Address Bus 87 contains five lines for addresses 1 through 5. Additional control lines include Counters Clear 89, Counters Clock 91, Two's Compliment 93, and Correlation Load In 95. Input data lines include Sideband 97, Amplitude Bus 80, Frequency Bus 82, Course Angle A Bus 84, Course Angle B Bus 86, Fine Angle A Bus 88, and Fine Angle B Bus 90. Power and ground to the integrated circuit are provided by VCC 92 and Ground 94. Test Pins 76, Data Bus 96, and Correlation Load 98 round out the remaining pins on this gate array circuit.

The invention has now been explained with reference to specific embodiments. Other embodiments will be apparent to those of ordinary skill in the art in light of this disclosure. Therefore it is not intended that this invention be limited, except as indicated by the appended claims.

We claim:

1. An adaptive RADAR environmental signal filter for selectively preprocessing RF RADAR input data prior to utilization of the data by a processor, comprising:

a plurality of discriminator means which receives as input the RF RADAR input data and compare selected values of the data to corresponding upper and lower threshold values calculated by the processor and transmit output values based on the logical relationship between the values of the RF RADAR data and the threshold values;

a discriminator enable latch which receives an input from the processor and generates an output, for synchronizing the outputs of the discriminator means; and first combinational logic means which receives the output values of each of the plurality of discriminator means and the output from the discriminator enable latch, and which generates as its output a correlation signal which instructs the processor to store the RF RADAR input data for further processing.

2. The signal filter of claim 1 in which each of the plurality of discriminator means further comprises:

comparator means which receives the RF RADAR input data and logically compares selected values of the data to corresponding upper and lower threshold values calculated by the processor to produce a compared data output;

second combinational logic which receives the compared data output from the comparator means and produces a logical TRUE output whenever certain of the selected values of the RF RADAR input data lie between the corresponding upper and lower threshold values;

a counter which receives the output of the second combinational logic and increments in value whenever a logical TRUE output is received from the second combinational logic, for informing the processor of the number of logical TRUE outputs transmitted by the comparator; and latch means for receiving and storing minimum and maximum threshold output values calculated by the processor and for transmitting the stored threshold values to the comparator, such that the threshold values may be dynamically varied to control the percentage of RF RADAR inputs which produce logical TRUE outputs.

3. A method for adaptive environmental filtering of RF RADAR signals using a comparator having a plurality of inputs and a counter, wherein the method comprises the steps of:

applying an RF RADAR signal to a first set of comparator inputs;

applying upper and lower threshold values to a second set of comparator inputs;

comparing the RF RADAR signal to the threshold values and producing a logical TRUE output when the signal falls within the limits established by the upper and lower threshold values;

incrementing the counter value when a logical TRUE output is produced;

reading the counter value at known intervals to determine the counter increment rate which represents the rate at which logical TRUE outputs are produced by the comparator; and dynamically adjusting the upper and lower threshold values to control the rate at which logical TRUE values are produced by the comparator.

* * * * *